(12) United States Patent
Jacobs et al.

(10) Patent No.: US 8,410,725 B2
(45) Date of Patent: Apr. 2, 2013

(54) LIGHTING SYSTEM FOR HORTICULTURAL APPLICATIONS

(75) Inventors: Joseph Hendrik Anna Maria Jacobs, Eygelshoven (NL); Matthias Wendt, Wuerselen (DE); Heinz Willi Van Der Broeck, Zuelpich (DE); Brigitte Van Der Broeck, legal representative, Zuelpich (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 125 days.

(21) Appl. No.: 12/602,196

(22) PCT Filed: Jun. 3, 2008

(86) PCT No.: PCT/IB2008/052159
§ 371 (c)(1),
(2), (4) Date: May 26, 2010

(87) PCT Pub. No.: WO2008/149286
PCT Pub. Date: Dec. 11, 2008

(65) Prior Publication Data
US 2010/0244724 A1   Sep. 30, 2010

(30) Foreign Application Priority Data
Jun. 5, 2007   (EP) .................................. 07109655

(51) Int. Cl.
*H05B 37/00* (2006.01)
(52) U.S. Cl. ...................... 315/312; 315/185 R; 315/253

(58) Field of Classification Search .............. 315/185 R, 315/186, 209 R, 224–226, 246, 276, 291, 315/294, 253, 312
See application file for complete search history.

(56) References Cited

U.S. PATENT DOCUMENTS

| | | | | |
|---|---|---|---|---|
| 4,298,869 | A * | 11/1981 | Okuno | 345/82 |
| 4,935,859 | A * | 6/1990 | Kirchberg et al. | 363/39 |
| 5,583,402 | A * | 12/1996 | Moisin et al. | 315/307 |
| 6,388,393 | B1 * | 5/2002 | Illingworth | 315/291 |
| 6,853,150 | B2 | 2/2005 | Clauberg et al. | |
| 6,921,182 | B2 | 7/2005 | Anderson, Jr. et al. | |
| 7,053,560 | B1 | 5/2006 | Ng | |

(Continued)

FOREIGN PATENT DOCUMENTS

| | | |
|---|---|---|
| EP | 1479286 A1 | 11/2004 |
| EP | 1574126 A1 | 9/2005 |

(Continued)

*Primary Examiner* — Tung X Le
(74) *Attorney, Agent, or Firm* — Kenneth D. Springer; Mark L. Beloborodov

(57) ABSTRACT

Horticultural lighting system comprising a first string (22) of at least one light element (16, 40), a second string (24) of at least one light element (16, 40), both strings being electrically connected in parallel with each other, a power supply unit (12, 50, 60, 70) providing an AC current/voltage to the parallel circuit of the strings, and means for energizing (26, 42) the first string during a first half period of the AC voltage and the second string during a second half period of the AC voltage, so that each string radiates pulsed light, said first string and said second string being arranged such that different areas (32, 34) are irradiated. The lighting system is also to be used in an environment where living organisms are irradiated with light, or a greenhouse for exposing plants to pulsed light. A corresponding method is also claimed.

14 Claims, 7 Drawing Sheets

U.S. PATENT DOCUMENTS

| | | |
|---|---|---|
| 7,138,770 B2 | 11/2006 | Uang et al. |
| 7,852,010 B2 * | 12/2010 | Negley ................... 315/185 R |
| 8,074,397 B2 * | 12/2011 | Yoneda et al. ........... 47/58.1 LS |
| 2003/0043611 A1 * | 3/2003 | Bockle et al. ................ 363/131 |
| 2004/0080941 A1 | 4/2004 | Jiang et al. |
| 2004/0109302 A1 | 6/2004 | Yoneda et al. |
| 2004/0110279 A1 * | 6/2004 | Everett ....................... 435/292.1 |
| 2004/0230102 A1 * | 11/2004 | Anderson et al. ............. 600/231 |
| 2005/0136197 A1 * | 6/2005 | Liu ................................ 428/13 |
| 2005/0276046 A1 * | 12/2005 | Oppor et al. .................. 362/249 |
| 2008/0231204 A1 * | 9/2008 | Praiswater et al. ........... 315/192 |

FOREIGN PATENT DOCUMENTS

WO      2005048658 A1      5/2005

* cited by examiner

LIGHTING SYSTEM FOR HORTICULTURAL APPLICATIONS

FIELD OF THE INVENTION

The present invention relates to a horticultural lighting system, the use of such a lighting system for exposing plants to pulsed light, and a method of irradiating plants in a greenhouse with pulsed light.

BACKGROUND OF THE INVENTION

Generally, lighting systems are used for horticultural applications in greenhouses or other environments where living organisms are to be irradiated with light, e.g. photo-bioreactors, to support plant growth. When developing new horticultural systems, one of the most important goals is the reduction of the total cost of ownership (TCO).

In the art, different documents report on the influence of pulsed light on the growth of plants, e.g. US 2004/0109302 A1. The described studies show that pulsed light (frequency, duty cycle), compared to continuous light, has a positive effect on energy consumption but no negative effect on plant growth. It is believed that a plant's pigment cannot directly absorb a second photon after absorption of a first photon. So, pulsed light decreases the TCO due to reduced power consumption, thereby increasing the overall efficiency of the system. A light source that can be easily pulsed is a light emitting diode (LED). The efficiency of today's LEDs (measured in micromole/J) is getting close to or is already above that of state-of-the-art high pressure sodium lamps. In addition, the emission spectra can be tuned to the absorption spectra of the pigments. A problem, however, is that drivers for LEDs do not offer a high efficiency, a high power density, high reliability and galvanic isolation at the same time.

Another problem relating to high pressure sodium lamps for horticultural applications is that they typically generate light in the green/yellow spectrum. However, the absorption spectra of most common pigments are in a different frequency range.

SUMMARY OF THE INVENTION

In view of the above, it is an object of the present invention to provide a lighting system which overcomes the deficiencies of prior art lighting systems, particularly systems using high pressure sodium lamps. A further object is to reduce the total cost of ownership of the lighting system.

These objects are achieved by a horticultural lighting system, preferably for greenhouses or other environments where living organisms are irradiated with light, like photo-bioreactors, comprising a first string of at least one light element, a second string of at least one light element, both strings being electrically connected in parallel with each other, a power supply unit providing an AC current/voltage to the parallel circuit of the strings, and means for energizing the first string during a first half period of the AC voltage and the second string during a second half period of the AC voltage, so that each string radiates pulsed light, said first string and said second string being arranged such that different areas are irradiated.

It is known from literature that pigments are not able to absorb a second photon directly after absorption of the first photon. This means that a break between two offered photons increases the efficiency of the system. The inventive horticultural lighting system uses this effect by providing two strings of light elements which are alternately energized by the same power supply unit, both strings of light elements being arranged to irradiate different areas of the greenhouse or the mentioned environment. Preferably, the output of the power supply unit is sinusoidal so that the resulting current through one of the two strings is the half cycle of a sinusoid. Hence, each string produces pulsed light, the frequency of which is dependent on the frequency of the AC current/voltage of the power supply unit. Since both strings do not irradiate the same area, the pulsed radiation is not balanced or equalized with respect to the illuminated area of the greenhouse.

In the context of the present invention, power supply unit means any component or circuitry being able to provide the required AC current/voltage. In the simplest case, the power supply unit only comprises electrical lines and input terminals which are connected with the mains or any other AC grid. Typically, the power supply unit comprises driver circuitry to provide an AC voltage with a predetermined frequency other than the mains frequency.

In the context of the present invention, means for energizing is any device or component which may enable or disable current flow in at least one direction, like switches which can block current flow in two directions, or diodes which can block current flow in one direction, One of the advantages of this inventive lighting system is that it is very efficient in terms of energy consumption, since both half periods of the AC current/voltage are used for generating light which illuminates two different areas. Hence, the total cost of ownership may be reduced. In other words, the inventive lighting system combines pulsed light for irradiating plants or any other living organisms with modern driver technology for achieving a very energy-efficient system.

In a preferred embodiment, said means for energizing comprises a first diode assigned to the first string and a second diode assigned to the second string, both diodes being provided anti-parallel to each other.

In other words, each string comprises a diode connected in series with the at least one light element of the string, both diodes being provided anti-parallel to each other so that current of the power supply unit flows to both strings alternately and in different directions. The use of diodes as means for controlling the current flow is cheap and less complex compared to other solutions to control current flow, like electronic switches, etc.

In a further preferred embodiment, said light elements comprise light emitting diodes (LED) and/or organic light emitting diodes.

This measure has the advantage that light emitting diodes are very energy-efficient elements compared to high pressure sodium lamps generally used in horticultural applications. It is to be noted that "light emitting diode" in the context of the present invention also means organic light emitting diode.

A further advantage of light emitting diodes is that they also take over the function of the energizing means. It is only necessary to arrange the LEDs in both strings anti-parallel to each other.

A further preferred embodiment comprises electrical lamps.

It is to be noted that the light elements may also comprise any combination of light emitting diodes and lamps. Further, the strings may be asymmetrical, meaning that the number of light elements and/or the type of light elements are different in the strings.

Preferably, each string comprises a plurality of light elements, preferably LEDs, which are connected to each other in series, parallel or any combination of parallel and series connections.

The aforementioned measures have the advantage that the implementation of a very cost-effective and energy-efficient lighting system is achievable.

In a further preferred embodiment, said power unit comprises a DC-to-AC converter. More preferably, said converter comprises a resonant half-bridge converter or a resonant full-bridge converter.

The provision of a resonant converter offers a plurality of advantages, for example galvanic isolation which is often required if the power supply unit is fed by mains voltage. Further, the power supply unit has a high efficiency due to soft-switching. Further, high power density is achievable because a very high switching frequency can be used. Hence, the passive components can be designed small. Further, the reliability is very high due to reduced stress of the components.

In a further preferred embodiment, said light elements are selected such that their emission spectra match the absorption spectra of plants to be irradiated in the greenhouse. Preferably, some of the light elements have different wavelengths. More preferably, the frequency of said AC voltage is selected such that the pulse period of the light elements is between 2 microseconds and 20 milliseconds, preferably between 10 microseconds and 1 millisecond, preferably 100 microseconds.

The aforementioned measures have the advantage that the growth of the plants irradiated by the lighting system is additionally supported and enhanced.

An object of the present invention as mentioned above is also achieved by using the inventive lighting system in an environment where living organism can be irradiated with light, or a greenhouse for exposing plants to pulsed light.

The object mentioned above is also achieved by a method of irradiating plants in a greenhouse or other living organisms in a special environment with pulsed light from light elements arranged in two parallel-connected strings, which strings are both adapted to radiate light to different areas of the greenhouse or the environment, said method comprising the steps of:

providing an AC current/voltage,
energizing one string during the first half period of the AC voltage for radiating light to a first area, and
energizing the other string during the second half period of the AC voltage for radiating light to a second area different to the first area.

This method achieves the same advantages as mentioned above, so that reference is made thereto.

It is further preferred that said AC voltage is selected such that the pulse period is between 2 microseconds and 20 milliseconds, preferably between 10 microseconds and 1 millisecond, preferably 100 microseconds.

This pulse period has proved to be advantageous.

Further features and advantages can be taken from the following description and the enclosed drawings.

It is to be understood that the features mentioned above and those yet to be explained below can be used not only in the respective combinations indicated, but also in other combinations or in isolation, without leaving the scope of the present invention.

BRIEF DESCRIPTION OF THE DRAWINGS

Embodiments of the invention are shown in the drawings and will be explained in more detail in the description below with reference to same. In the drawings.

DETAILED DESCRIPTION OF EMBODIMENTS

Figure 1A:
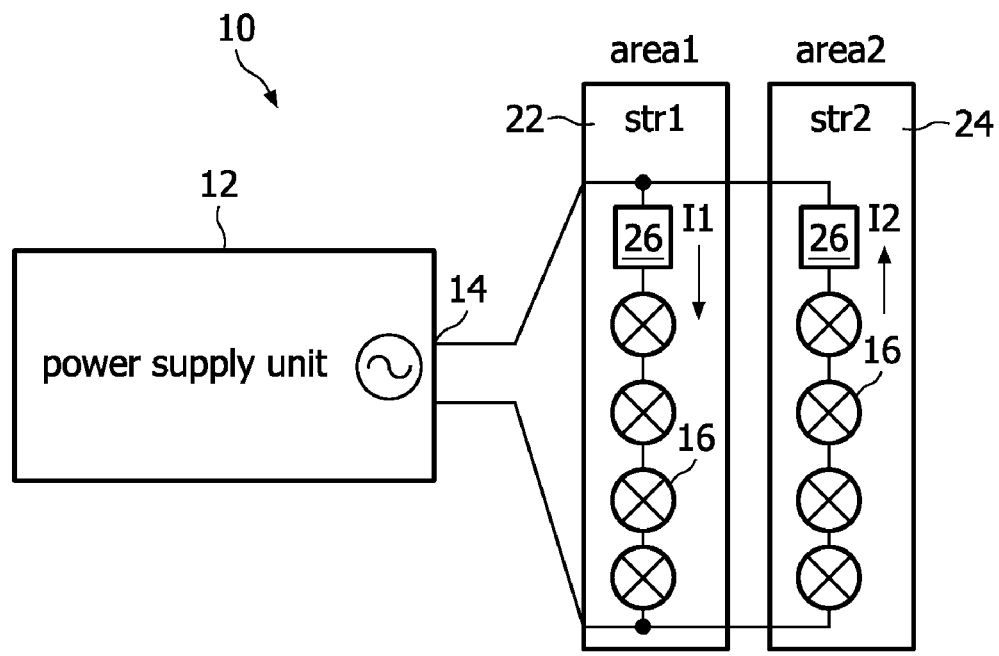
FIG. 1a is a schematic block diagram of an inventive horticultural lighting system for greenhouses.

In FIG. 1, a horticultural lighting system is schematically shown and indicated with reference numeral 10. It is to be noted that it is only a block diagram not showing all details of the electrical circuits. The lighting system 10 is used for horticultural applications in greenhouses to irradiate plants in the greenhouse with pulsed light. As already mentioned before, pulsed light enhances the growth of the irradiated plants.

The lighting system 10 comprises a power supply unit 12 which provides, at output terminals 14, an AC voltage. The performance of the power supply unit 12 is adapted to the type and number of light elements supplied with power. The light elements are indicated with reference numeral 16 in FIG. 1a. The light elements 16 are arranged in two groups forming a first string 22 and a second string 24, both strings being connected in parallel with each other and with the output 14 of the power supply unit 12. Each string 22, 24 may comprise one or more light elements 16 that are serially connected as shown in FIG. 1a. However, it is to be noted that each string 22, 24 may also comprise parallel connections of light elements 16 or a combination of serially and parallel connected light elements 16.

Figure 1B:
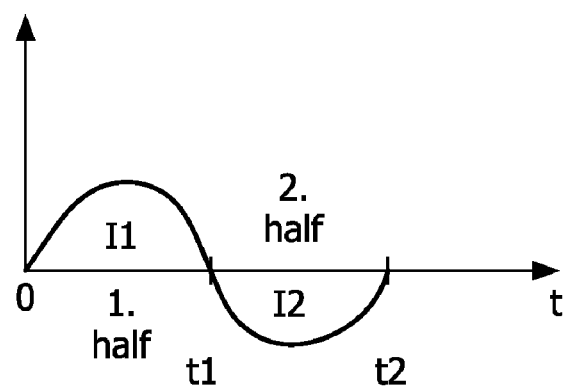
FIG. 1b is a voltage diagram illustrating the output of the power supply unit.

Further, each string 22, 24 comprises a current control means 26 which controls the current flow through the respective light elements 16 of the string. Particularly, the current control means 26 are adapted such that current flows through the light elements 16 of the first string 22 during a first period and through the light elements 16 of the second string 24 during a second period. It is preferred that the first period corresponds to the first half of the period of the AC voltage supplied by the power supply unit 12 and the second period corresponds to the second half of the AC voltage, as schematically shown in FIG. 1b.

Both current control means 26 cause the light elements 16 to generate pulsed light, such that the light pulses of the first string and the second string 22, 24 alternate.

Figure 1C:
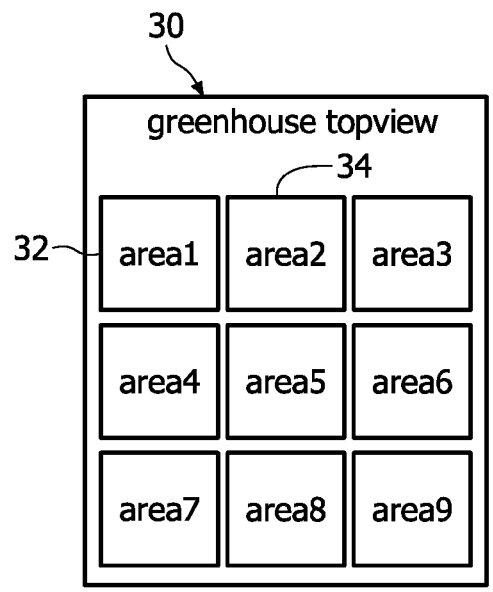
FIG. 1c is a schematic top view diagram of a greenhouse with different areas.

In FIG. 1c, a top view of a greenhouse is schematically shown and indicated with reference numeral 30. The greenhouse 30 generally has a surface area which may be divided in a plurality of sub-areas as shown in FIG. 1c. It is to be noted that the rectangular shape of the surface area and the sub-areas is only for illustration purposes. In this example, the surface area is divided into nine sub-areas, of which sub-area 1 and sub-area 2 are indicated with reference numeral 32 and 34, respectively. Due to the fact that pulsed light is advantageous for plant growth, the light elements 16 of a string 22, 24 are used to irradiate sub-areas 32, 34. In other words, for example the first string 22 of light elements 16 illuminates the sub-area 32, and the second string 24 the sub-area 34. The light elements 16 of both strings 22, 24 should not illuminate the same sub-area because the positive effect of pulsed light on plant growth would then be lost.

It is to be noted that the assignment of strings 22, 24 to adjacent sub-areas 32, 34 is only an example and not the only solution. The arrangement and orientation of the light elements 16 of both strings 22, 24 should only ensure that the strings 22, 24 irradiate different areas of the greenhouse 30 and hence different plants.

Figure 2:
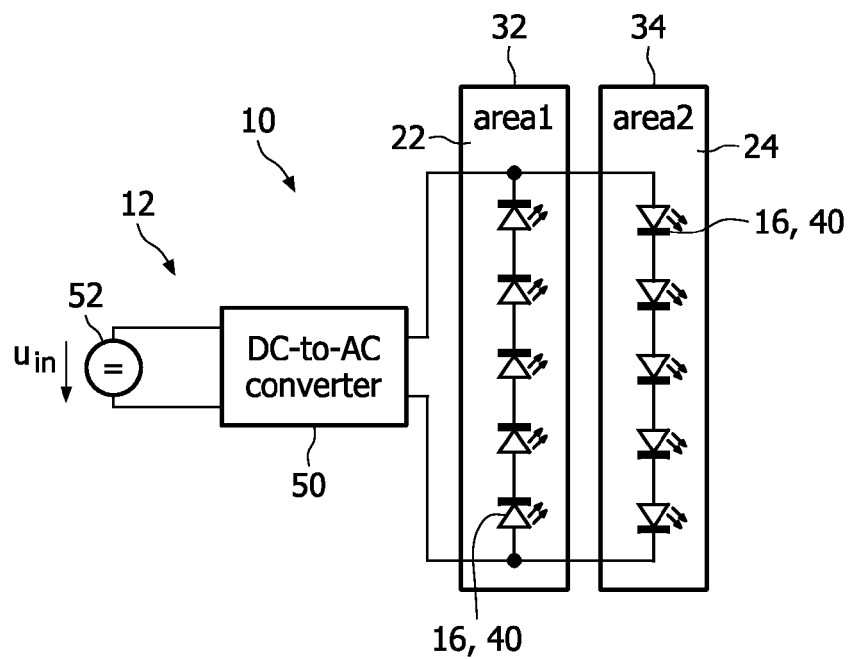
FIG. 2 is a preferred embodiment of the horticultural lighting system.

In FIG. 2 one preferred embodiment of a horticultural lighting system 10 is shown in form of a block diagram. The power supply unit 12 comprises a DC-to-AC converter 50 and a DC source 52. The DC-to-AC converter 50 is adapted to convert the DC voltage to an AC voltage supplied to the strings 22, 24.

Further, in this embodiment the light elements 16 are light emitting diodes 40, the LEDs 40 of the first string 22 being anti-parallel to the LEDs 40 of the second string 24.

Due to the fact that light emitting diodes 40 have also the function of current control means, namely to allow current flow only in one direction, the LEDs 40 replace also the current control means 26, shown in FIG. 1a.

By providing the LEDs 40 in the strings 22, 24 so as to be anti-parallel to each other, it is ensured that current I1, I2 passes through the LEDs 40 only during a half period of the sinusoid of the current/voltage supply.

The frequency of the supplied AC voltage is selected such that the period of the light pulses generated by the LEDs 40 is between 2 microseconds and 1 millisecond. Preferably, the period is 100 microseconds. Hence, the AC frequency lies between 500 Hz and 250 kHz.

The LEDs 40 are preferably LEDs whose spectrum matches the absorption spectra of the plant's pigments. The adaptation of the LED spectrum to the absorption spectra of the plants further enhances the efficiency of the lighting system.

In FIG. 2, the AC supply voltage for the strings 22, 24 is generated by a DC-to-AC converter. In the art, there are multiple solutions as to how to implement such a converter 50. In FIGS. 3 to 8, two conceivable circuits are shown. However, it is to be noted that other types of DC-to-AC converters are also possible to energize the light elements of the strings 22, 24.

Figure 3:
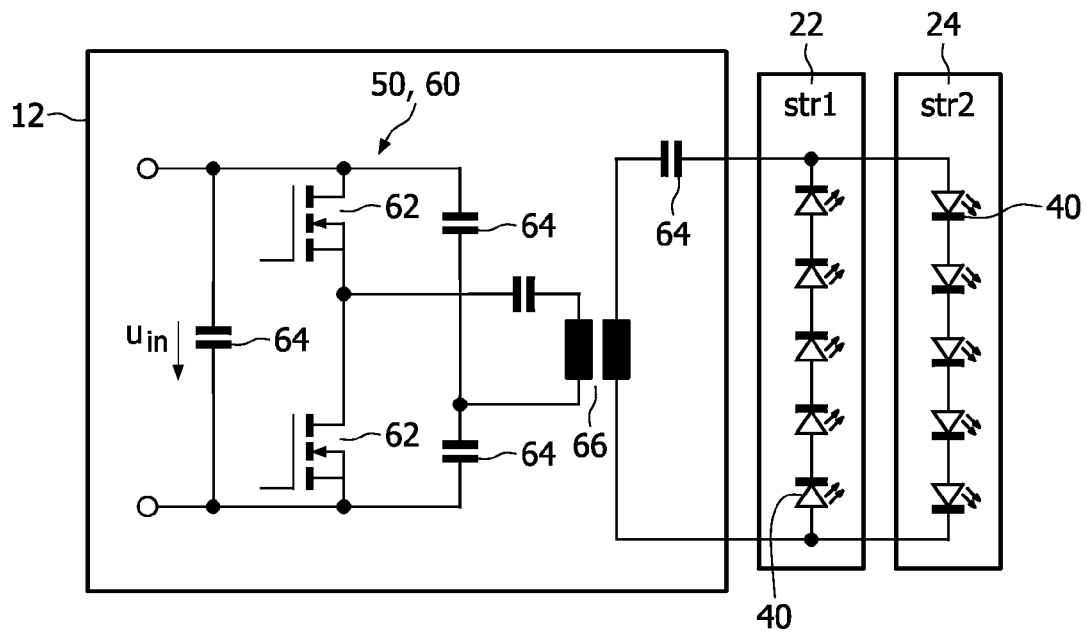
FIG. 3 is a schematic block diagram of the embodiment of FIG. 2 using a resonant half-bridge converter.

One preferred converter 50 is a so-called resonant half-bridge converter, which is indicated with reference numeral 60 in FIG. 3. The structure and function of such a half-bridge converter is known in the art, so that a detailed description may be refrained from. Generally, the half-bridge converter 60 comprises two switching elements 62 (transistors), which are coupled in series. Parallel to the series connection of the switching elements 62, a series connection of two capacitors 64 is provided. Further, the half-bridge converter comprises a transformer 66, the secondary side of which supplies the strings 22, 24 with energy via a capacitor 64.

The primary side of the transformer 66 is connected via a capacitor with the centre tap of the transistor series connection and with the centre tap of the capacitor series connection.

The transistors 62 are driven such that they alternately conduct so that an AC current passes the primary side of the transformer 66.

The advantages of resonant converters, like the half-bridge converter 60, are for example galvanic isolation, high power density, because very high switching frequencies can be used, and high reliability due to the reduced stress of the components. Further, high efficiency is achievable due to soft-switching, the efficiency being even higher than in standard cases because the output rectifier has been illuminated.

Figure 4:
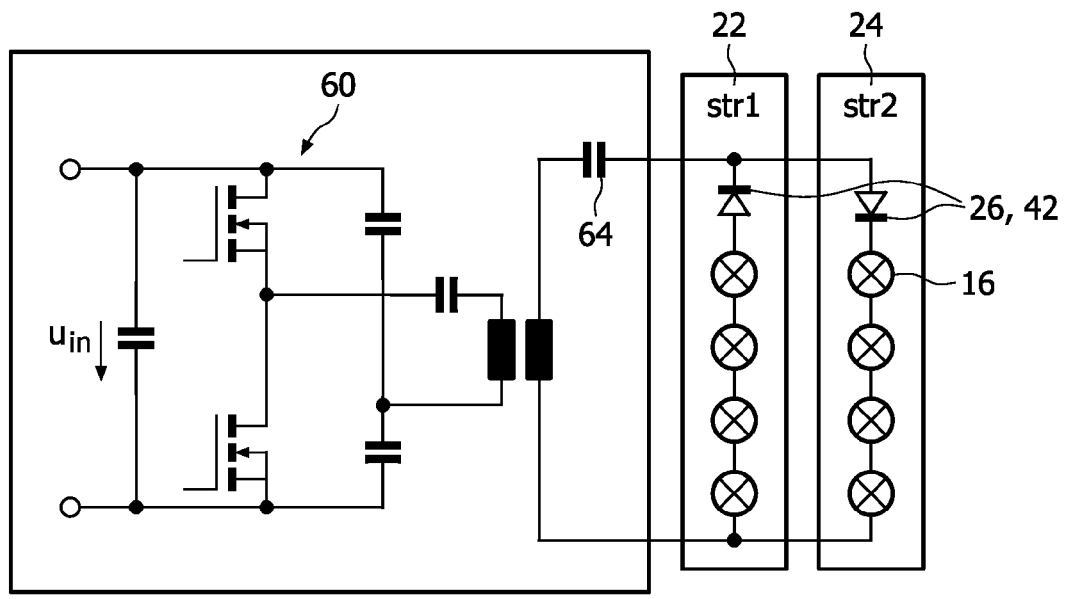
FIG. 4 is a schematic block diagram of a further embodiment using diodes as means for energizing.
Figure 5:
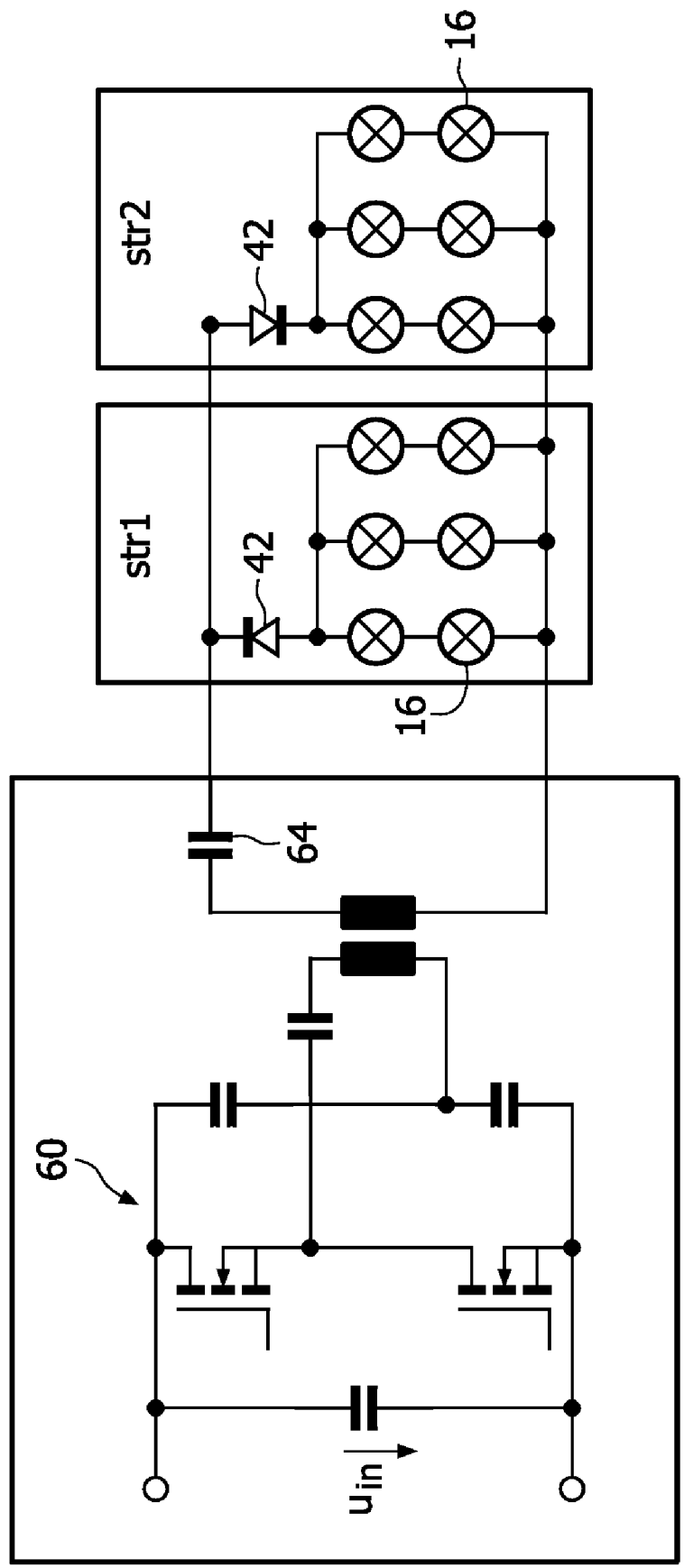
FIG. 5 is a schematic block diagram of a further embodiment using light elements arranged in series and parallel to each other.

The embodiments shown in FIGS. 4 and 5 also use resonant half-bridge converters 60, but are different with respect to the implementation of the strings 22, 24.

In the embodiment shown in FIG. 4, the first string 22 comprises a plurality of light elements 16 and a first diode 42 as current control means 26. The second string 24 comprises also a plurality of light elements 16 and a second diode 42 as a current control means. Both diodes 42 are provided anti-parallel to each other so that AC current only flows through one string at the same time. Particularly, the light elements 16 of the first string 22 generate light during the first half of the sinusoid of the AC power supply (under ideal circumstances), whereas the light elements 16 of the second string 24 generate light during the second half of the sinusoid.

In FIG. 5, a further embodiment is shown which is similar to that shown in FIG. 4 with the exception that both strings 22, 24 comprise light elements 16 which are also coupled parallel to each other. However, the function of this lighting system is the same as that of the aforementioned lighting systems.

Figure 6:
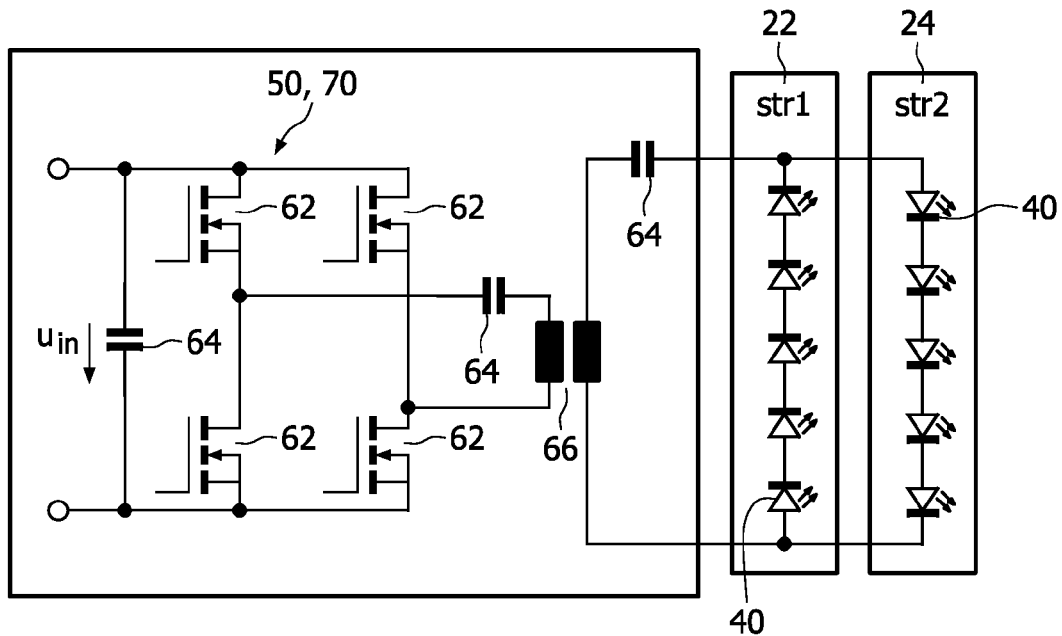
FIG. 6 is a schematic block diagram of a further embodiment of the inventive lighting system with a resonant full-bridge converter.
Figure 7:
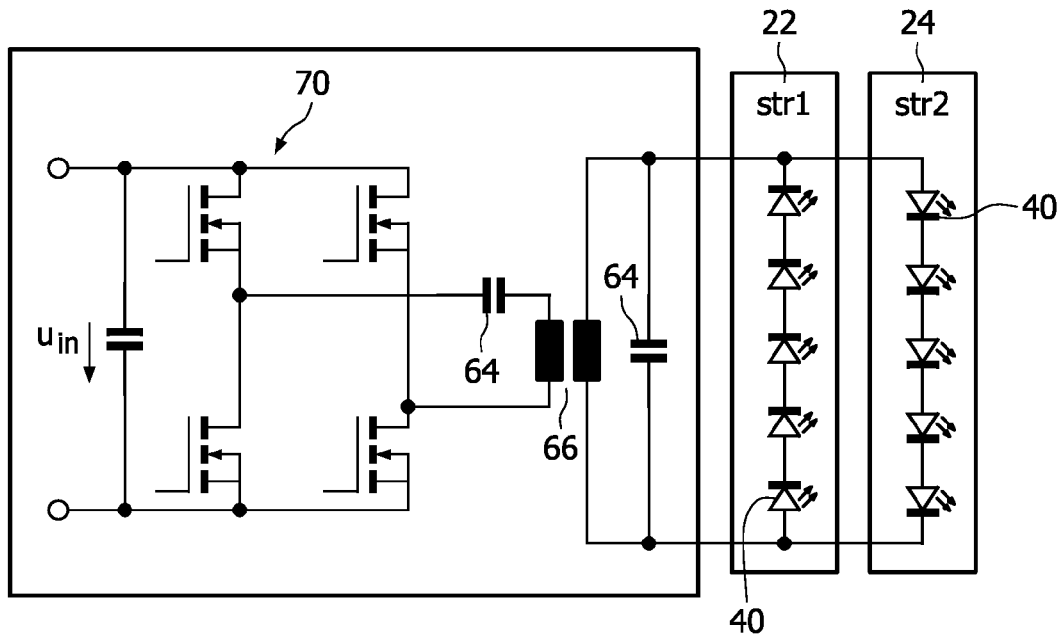
FIG. 7 is a schematic block diagram of the embodiment shown in FIG. 6 with a capacitor that is differently arranged.
Figure 8:
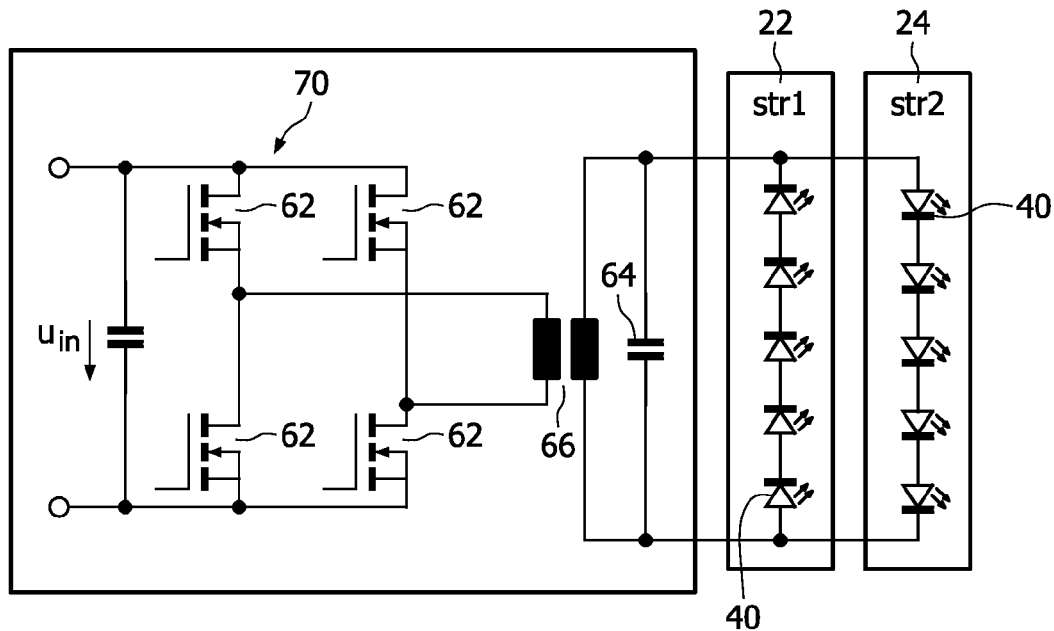
FIG. 8 is a schematic block diagram of a further embodiment of an inventive lighting system with a full-bridge converter slightly different to that shown in FIGS. 6 and 7.

In FIGS. 6 to 8, three further embodiments of a lighting system 10 are schematically shown which use so-called resonant full-bridge converters instead of half-bridge converters as described with respect to FIGS. 3 to 5. In FIGS. 6 to 8, the full-bridge converters are indicated with reference numeral 70.

Generally, the structure and function of full-bridge converters is known in the art, so that a detailed description is refrained from. Contrary to the half-bridge converter, the full-bridge converter comprises two further switching elements (transistors) 62 which replace the series connection of the capacitors 64 in the half-bridge converter. To achieve current reversal on the primary side of the transformer 66, diagonal pairs of transistors 62 are alternately switched and hence alternately conduct.

In the embodiment of FIG. 6, the primary side of the transformer 66 is coupled via a capacitor 64 with a centre tap of the first series connection of transistors 62 and directly with the centre tap of the second series connection of transistors 62. Further, on the secondary side, a capacitor 64 is provided in series with the parallel connection of both strings 22, 24.

The embodiment shown in FIG. 7 differs from that shown in FIG. 6 by the connection of the capacitor 64 on the secondary side. Here, this capacitor is provided parallel to the strings 22, 24.

The embodiment shown in FIG. 8 differs from that shown in FIG. 7 by a direct connection of the primary side of the transformer 66 with the centre tap of the first series connection of transistors 62. Hence, there is no capacitor in series with the primary side of the transformer 66.

Figure 9:
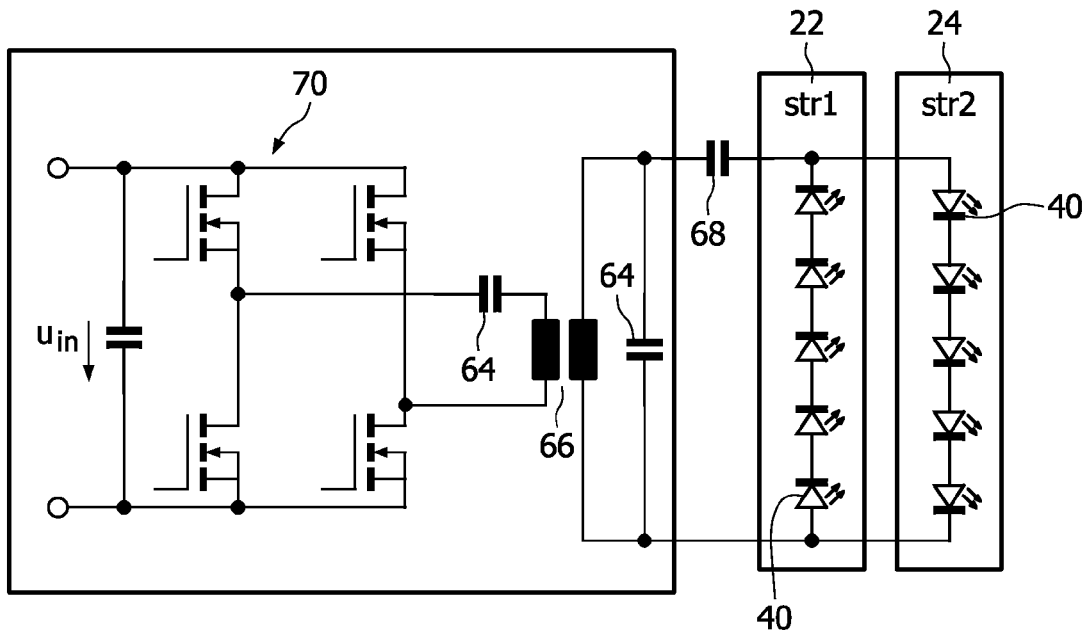
FIG. 9 is a schematic block diagram of the embodiment shown in FIG. 7 with a further capacitor.
Figure 10:
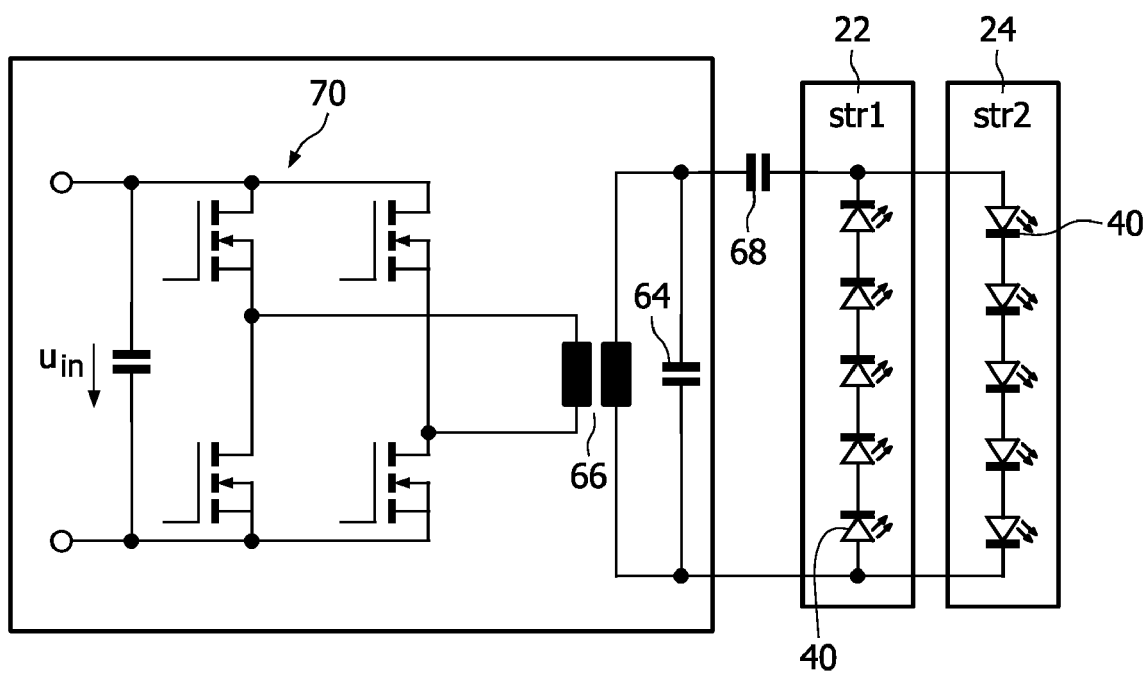
FIG. 10 is a schematic block diagram of the embodiment shown in FIG. 8 with a further capacitor.

The embodiments shown in FIGS. 9 and 10 are similar to the embodiments shown in FIGS. 7 and 8, respectively, with the difference that a further capacitor 68 is connected in series with the parallel connection of both strings 22, 24.

As already mentioned before, the various embodiments shown in FIGS. 3 to 8, particularly with respect to the design of the power supply unit 12, namely the AC to DC converter 50, are only examples of conceivable solutions but shall not be considered as limiting the scope of the invention. Of course, there are other possibilities to provide an AC voltage with a desired frequency to the parallel-connected strings 22, 24. Moreover, the inventive system and method can also be applied to multi-phase systems.

The main aspect of the invention is the provision of two strings of light elements connected parallel to each other and adapted such that both strings are energized alternately. Hence, the light elements of a string generate pulsed light, and the light pulses of the strings are generated alternately and hence not at the same time. Further, the light elements of the strings are arranged so that they irradiate different areas of the greenhouse. Consequently, the plants receive the light only from one string. Hence, there is always a "dark" phase between successive light pulses received by a plant.

The invention claimed is:

1. A horticultural lighting system for irradiating plants in a greenhouse or other living organisms in a predetermined environment, the system comprising
    a first string of at least one light element,
    a second string of at least one light element, both strings being electrically connected in parallel with each other,
    a power supply unit providing an AC current/voltage to the parallel circuit of the strings, and
    means for energizing the first string during a first half period of the AC voltage and the second string during a second half period of the AC voltage, so that each string radiates pulsed light, said first string and said second string being arranged irradiated, wherein the lighting system is installed in the greenhouse, where the greenhouse has a plurality of different areas, and wherein the first string and the second string are arranged such that only a first area of the greenhouse is irradiated by the pulsed light of the first string and only a second area of the greenhouse different from the first area is irradiated by the pulsed light of the second string.

2. Lighting system of claim 1, wherein said means for energizing comprises a first diode assigned to the first string and a second diode assigned to the second string, both diodes being provided anti-parallel to each other.

3. Lighting system of claim 2, wherein said first and second diodes are light emitting diodes and/or organic light emitting diodes.

4. Lighting system of claim 1, wherein said light elements comprise light emitting diodes and/or organic light emitting diodes.

5. Lighting system of claim 1, wherein said power unit comprises a DC-to-AC converter.

6. Lighting system of claim 1, wherein said light elements are selected such that their emission spectra match the absorption spectra of plants to be irradiated.

7. Lighting system of claim 1, wherein some of the light elements have different wavelengths.

8. Lighting system of claim 1, wherein the frequency of said AC voltage is selected such that the pulse period of the light elements is between 2 µs and 20 ms.

9. The lighting system of claim 1, wherein the frequency of said AC voltage is selected such that each half period is between 2 µs and 1 ms.

10. The lighting system of claim 1, wherein the frequency of said AC voltage is selected such that each half period is about 100 µs.

11. A method of irradiating plants in a greenhouse or other living organisms in a predetermined environment with pulsed light from light elements arranged in two parallel-connected strings, which strings are both adapted to radiate light to different areas, said method comprising the steps of:
    providing an AC current/voltage,
    energizing one string during the first half period of the AC voltage for radiating light to a first area of the greenhouse or predetermined environment, and
    energizing the other string during the second half period of the AC voltage for radiating light to a second area different to the first area;
    providing the two parallel-connected strings in the greenhouse;
    irradiating plants in the first area of the greenhouse in response to energizing the one string during the first half period of the AC voltage; and
    irradiating plants in the second area of the greenhouse in response to energizing the other string during the second half period of the AC voltage.

12. Method of claim 11, wherein said AC voltage is selected such that the pulse period is between 2 µs and 20 ms.

13. The method of claim 11, wherein the AC voltage is selected such that each half period is between 2 µs and 1 ms.

14. The method of claim 11, wherein the AC voltage is selected such that each half period is about 100 µs.

* * * * *